(12) United States Patent
Minezawa et al.

(10) Patent No.: US 10,488,838 B2
(45) Date of Patent: Nov. 26, 2019

(54) CONTROLLER, HOME SYSTEM, SCREEN GENERATION METHOD, AND RECORDING MEDIUM

(71) Applicant: Mitsubishi Electric Corporation, Tokyo (JP)

(72) Inventors: Satoshi Minezawa, Tokyo (JP); Ichiro Maruyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 257 days.

(21) Appl. No.: 15/328,598

(22) PCT Filed: Jul. 31, 2014

(86) PCT No.: PCT/JP2014/070225
§ 371 (c)(1),
(2) Date: Jan. 24, 2017

(87) PCT Pub. No.: WO2016/017003
PCT Pub. Date: Feb. 4, 2016

(65) Prior Publication Data
US 2017/0212491 A1 Jul. 27, 2017

(51) Int. Cl.
*G06F 12/0875* (2016.01)
*G05B 19/042* (2006.01)
*G06F 3/0484* (2013.01)

(52) U.S. Cl.
CPC ..... *G05B 19/0426* (2013.01); *G06F 12/0875* (2013.01); *G05B 2219/25022* (2013.01);
(Continued)

(58) Field of Classification Search
None
See application file for complete search history.

(56) References Cited

U.S. PATENT DOCUMENTS 9,152,737 B1* 10/2015 Micali ............... G06F 17/30958
2002/0112237 A1* 8/2002 Kelts ..................... G06F 3/0481
725/39

(Continued)

FOREIGN PATENT DOCUMENTS

JP H10-260889 A 9/1998
JP 2001-167190 A 6/2001
(Continued)

OTHER PUBLICATIONS

Office Action dated May 8, 2018 issued in corresponding JP patent application No. 2017-152159 (and English translation).
(Continued)

*Primary Examiner* — Chun Cao
*Assistant Examiner* — Gary Collins
(74) *Attorney, Agent, or Firm* — Posz Law Group, PLC

(57) ABSTRACT

Element data included in a management screen for management of a home electric appliance is stored in a server and a home electric appliance. A screen definition data storage stores screen definition data that defines content of the management screen and that includes an update specification that is stipulated for each of the element data to be acquired. A cache data storage stores the element data acquired beforehand from the server and the home electric appliance. The screen generator acquires, on the basis of the update specification included in the screen definition data, each corresponding element data from the cache data storage, or from the server and the home electric appliance, and generates the management screen. The controller transmits the generated management screen to the terminal device and causes display of the management screen.

19 Claims, 17 Drawing Sheets

(52) U.S. Cl.
CPC .... *G05B 2219/2642* (2013.01); *G06F 3/0484* (2013.01); *G06F 2212/455* (2013.01)

(56) References Cited

U.S. PATENT DOCUMENTS

| | | | |
|---|---|---|---|
| 2007/0055758 A1* | 3/2007 | McCoy | H04L 12/281 709/223 |
| 2007/0294400 A1 | 12/2007 | Sakuraba | |
| 2010/0138764 A1* | 6/2010 | Hatambeiki | G08C 17/02 715/765 |
| 2010/0198996 A1 | 8/2010 | Shiraki | |
| 2012/0096107 A1* | 4/2012 | Hatanaka | H04L 12/2823 709/213 |
| 2012/0109384 A1 | 5/2012 | Stepanian | |
| 2014/0122729 A1* | 5/2014 | Hon | H04L 67/04 709/228 |
| 2015/0319006 A1* | 11/2015 | Plummer | H04L 12/2827 700/83 |

FOREIGN PATENT DOCUMENTS

| | | |
|---|---|---|
| JP | 2002-044749 A | 2/2002 |
| JP | 2002-189618 A | 7/2002 |
| JP | 2003-271480 A | 9/2003 |
| JP | 2007-189738 A | 7/2007 |
| JP | 2007-334730 A | 12/2007 |
| JP | 2009-104353 A | 5/2009 |
| JP | 2010-176448 A | 8/2010 |
| JP | 2014-071600 A | 4/2014 |
| WO | 2012/094520 A2 | 7/2012 |

OTHER PUBLICATIONS

International Search Report of the International Searching Authority dated Oct. 21, 2014 for the corresponding International application No. PCT/JP2014/070225 (and English translation).

Office action dated Jul. 9, 2019 issued in corresponding JP patent application No. 2018-166683 (and English translation thereof).

* cited by examiner

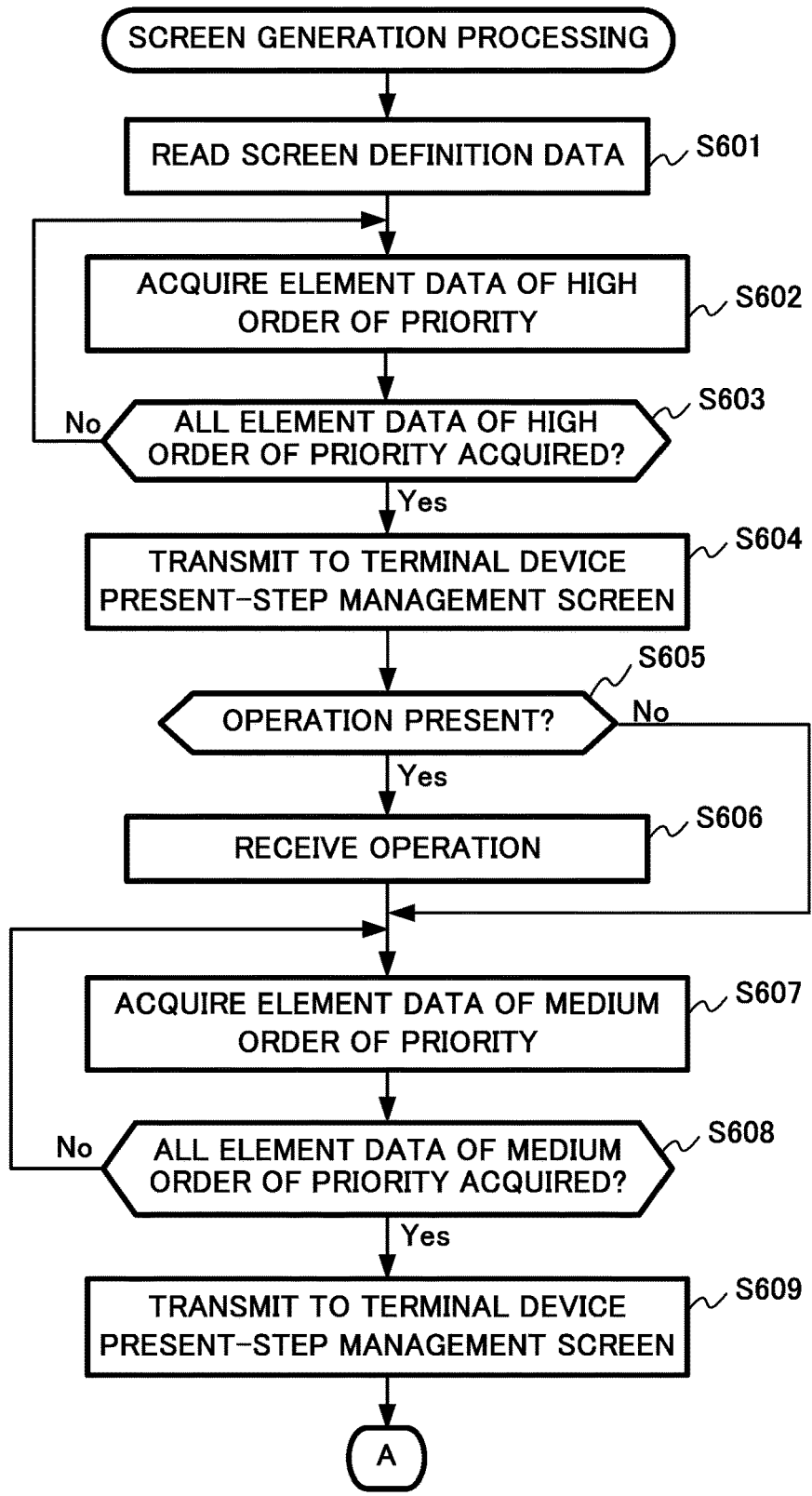

CONTROLLER, HOME SYSTEM, SCREEN GENERATION METHOD, AND RECORDING MEDIUM

CROSS REFERENCE TO RELATED APPLICATION

This application is a U.S. national stage application of International Patent Application No. PCT/JP2014/070225 filed on Jul. 31, 2014, the disclosure of which is incorporated herein by reference.

TECHNICAL FIELD

The present disclosure relates to a controller and a home system that enable appropriate improvement of response performance of screen generation.

BACKGROUND ART

In recent years, home systems that use a communication standard to connect various types of home electric appliances are wide-spread in private homes.

Management (monitoring and/or control) of the various home electric appliances by such a home system is performed through a controller by communicably connecting the controller to the home electric appliances such as air conditioners, lighting equipment, rice cookers, induction-heating type cookers, and dehumidifiers. Further, the controller, for example, may be communicably connected to an external server to enable acquisition of various types of data stored in the server.

Further, although a certain degree of management of the home electric appliances is possible even by a stand-alone controller, normally the controller is connected, by a means such as a wireless connection, to a terminal device such as a tablet or smartphone, and the home electric appliances are managed from the terminal device through the controller. In one example of such configuration, the controller generates a management screen (screen data) for management of the home electric appliances and provides the management screen to the terminal device.

This type of management screen includes element data (for example, home electric appliance operation condition, temperature, humidity, and home electric appliance power consumption) stored in the home electric appliances and element data (for example, each home electric appliance operation history, temperature history, humidity history, and home electric appliance cumulative energy consumption) stored in the server. That is to say, the element data are distributively stored in the server and the home electric appliances and are read (acquired) by the controller, and the controller generates the management screen. During such processing, a certain long time period is often required in particular for the communication between the controller and the external server, and this long time period causes a lowering of response performance of screen generation.

As a background technology for improvement of response performance of screen generation, Patent Literature 1, for example, discloses an invention that uses terminal device (browser)-side caching of a previously accessed homepage.

CITATION LIST

Patent Literature

Patent Literature 1: Unexamined Japanese Patent Application Kokai Publication No. H10-260889

SUMMARY OF INVENTION

Technical Problem

The invention of the aforementioned Patent Literature 1 has a configuration for caching the entire homepage, and thus this configuration cannot be easily used for a management screen and the like that are generated by the acquisition of the element data distributively stored in the server and the home electric appliances. For example, if even just one of the element data at the server and the home electric appliances is updated, even though the entire management screen is cached, then generation of the management screen is required by acquiring all of the element data from the server and the home electric appliances, and thus this configuration is not considered useful for the improvement of response performance of screen generation. Further, the procedure of the invention of Patent Literature 1 performs the management of the cache at the terminal device. Thus processing load of the terminal device may increase, and this may result in a lowering of response performance of screen generation.

The present disclosure is developed in order to solve the aforementioned problems, and thus an objective of the present disclosure is to provide a controller and a home system that enable appropriate improvement of response performance of screen generation.

Solution to Problem

In order to achieve the aforementioned objective, the controller of the present disclosure is a controller configured to connect through a network to a server and home electric appliances, element data configured in a management screen for management of the home electric appliances being stored in the server and the home electric appliances. The controller includes:

a screen definition data storage configured to store screen definition data defining content of the management screen, the screen definition data including update specifications, each of the update specifications defining one of the element data to be acquired;

a cache data storage configured to store the element data previously acquired from the server and the home electric appliances; and a screen generator configured to acquire from the cache data storage, or from the server and the home electric appliances, the element data, and generate the management screen, the acquiring being based on the update specifications included in the screen definition data.

Advantageous Effects of Invention

According to the present disclosure, the management screen is generated by acquiring from the cache data storage, or from the server and the home electric appliances, on the basis of the update specifications, the element data included in the management screen. That is to say, due to defining beforehand the update specification, for example, as "manual updating" for element data that is not required to be the newest element data, response performance of screen generation can be improved because communication is not performed to acquire element data that is previously stored in the cache data storage. Further, due to defining beforehand the update specification, for example, as "every-time updating" for element data that is required to be the newest element data, the element data is acquired (in the case in which there is newest element data) from the server and home electric appliances subject to element data acquisition, and thus effectiveness (real-timeliness) of such element data can be ensured. That is to say, the update specification of each of the element data is appropriately specified beforehand in response to the actual condition (for example, "easy-to-use") of the management screen, and thus response performance of screen generation can be appropriately improved.

BRIEF DESCRIPTION OF DRAWINGS

FIGS. 11A and 11B show a continuous flowchart illustrating an example of screen generation processing in Embodiment 2;

DESCRIPTION OF EMBODIMENTS

Embodiments of the present disclosure are described below in detail in reference to figures. Further, the same reference sign is assigned in the figures to components that are the same or equivalent. Although the present disclosure describes application of the present disclosure to a home system in a specific example, as described below, the present disclosure can also be applied to other systems. Accordingly, the below embodiments are to be regarded in an illustrative sense rather than a restrictive sense. Thus one skilled in the art can adopt modified embodiments that substitute equivalents for various elements or all elements of these embodiments, and such modified embodiments are included in the scope of the present disclosure.

Embodiment 1

Figure 1:
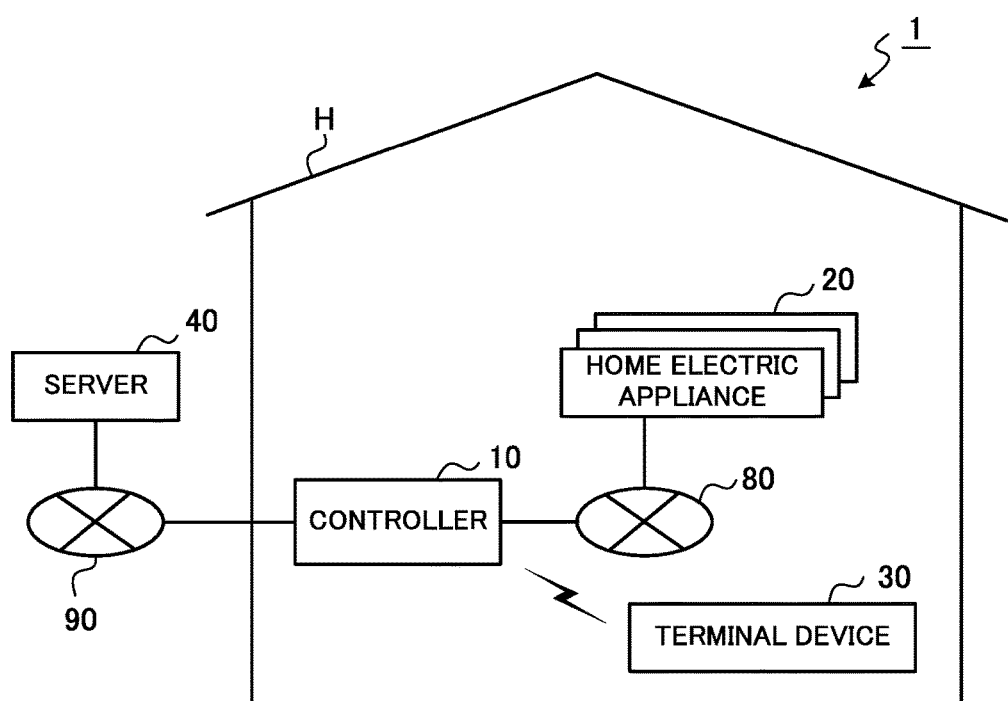
FIG. 1 is a block diagram illustrating one example of overall configuration of a home system of Embodiment 1 of the present disclosure.

FIG. 1 is a block diagram illustrated one example of overall configuration of a home system 1 according to Embodiment 1 of the present disclosure. This home system 1 is centered on a controller 10 and manages (monitors and/or controls) each of home electric appliances 20 while sending and receiving required data between a server 40 and each of the home electric appliances 20. As illustrated, the home system 1 includes the controller 10 installed within a home H (in-house), home electric appliances 20 installed within the home H, a terminal device 30 used in the home H, and a server 40 installed outside the home H (outside-of-house). Among these components, the controller 10, each of the home electric appliances 20, and the terminal device 30 are communicably connected through an in-house network 80 that includes, for example, a wired local area network (LAN) or a wireless LAN. Further, the controller 10 and the server 40 are communicably connected by an outside-of-house network 90, for example, the Internet.

The controller 10 is a device that controls the entire home system 1. The controller 10, as described below, appropriately acquires element data (for example, home electric appliance operation condition, temperature, humidity, and home electric appliance power consumption) distributively stored in the server 40 and the home electric appliances 20, and generates various types of management screens.

Figure 2:
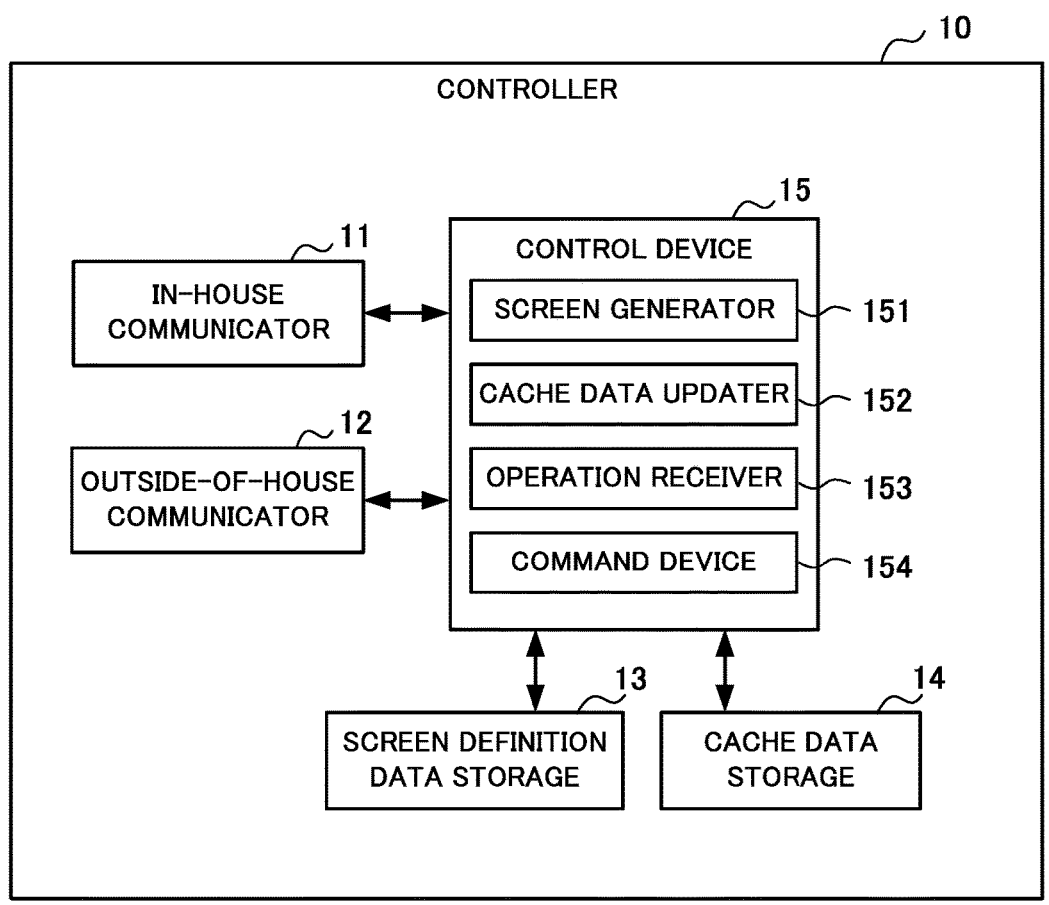
FIG. 2 is a block diagram illustrating one example of configuration of a controller of Embodiment 1.

One example of configuration of this controller 10 is described hereinafter in reference to FIG. 2. FIG. 2 is a block diagram illustrating one example of configuration of the controller 10 according to Embodiment 1 of the present disclosure. As illustrated, the controller 10 includes an in-house communicator 11, an outside-of-house communicator 12, a screen definition data storage 13, a cache data storage 14, and a control device 15.

The in-house communicator 11, for example, is a communication adaptor for connection to the in-house network 80, and under the control by the control device 15, communicates through the in-house network 80 with the terminal device 30 and each of the home electric appliances 20. For example, in response to a request from the controller 10, the in-house communicator 11 receives element data sent from each of the home electric appliances 20. Further, the in-house communicator 11 transmits to the terminal device 30 a management screen (screen data) generated by the control device 15, and more specifically, generated by a below-described screen generator 151.

The outside-of-house communicator 12 is a communication adapter for connection with the outside-of-house network 90, and under the control of the control device 15, communicates with the server 40 through the outside-of-house network 90. For example, the outside-of-house communicator 12, in response to a request from the controller 10, receives element data sent from the server 40. Further, the outside-of-house communicator 12, for example, at fixed time intervals, sends to and accumulates on the server 40 various types of data obtained by the controller 10 from each of the home electric appliances 20.

Figure 3:
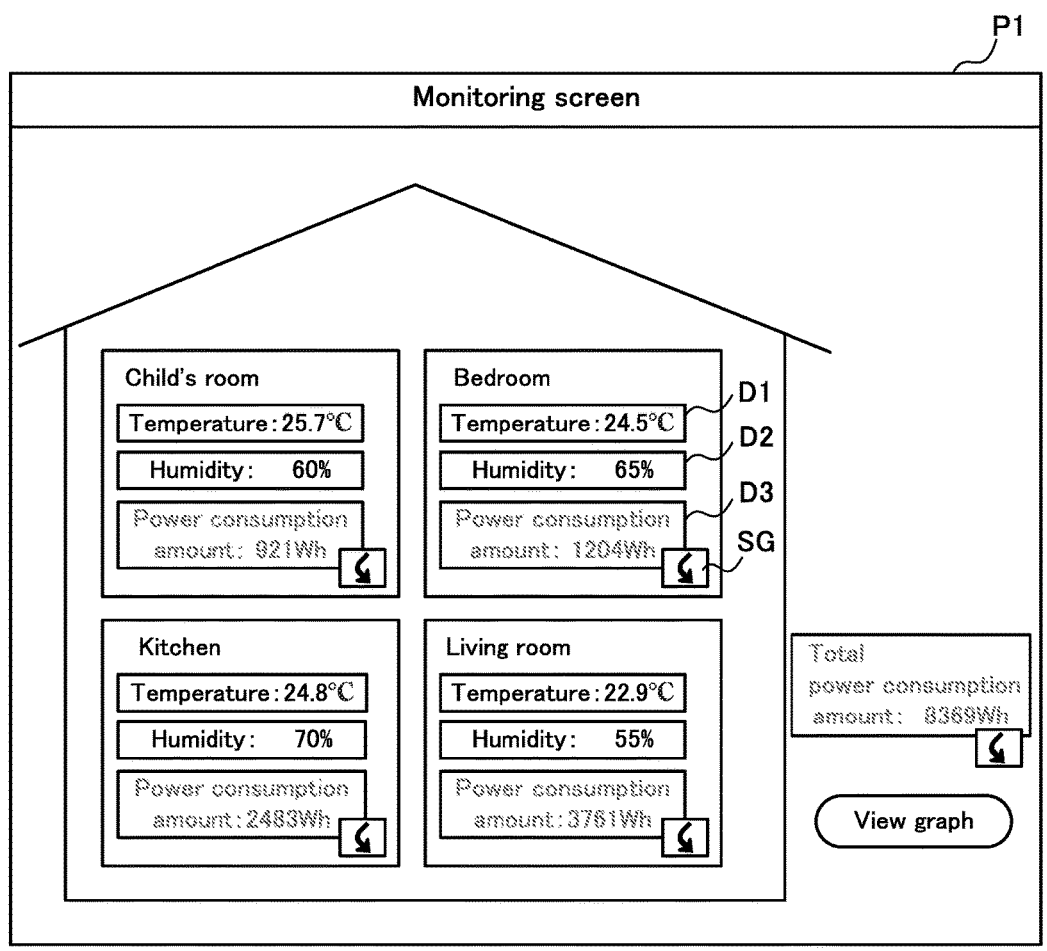
FIG. 3 is a schematic drawing illustrating one example of a management screen (monitoring screen)

The screen definition data storage 13, for example, includes non-volatile semiconductor memory and the like, and stores the screen definition data that defines content of the management screen. Specifically, the screen definition data storage 13 stores screen definition data that specifies each of the element data required for generation of management screens, such as a management screen P1 (monitoring screen) as illustrated in FIG. 3, and that specifies placement location of such element data, and the like. Further, in the example of FIG. 3, the "element data" may be a temperature D1, a humidity D2, a power consumption amount D3, and a symbol SG. The power consumption amount D3 is displayed in gray in this figure, and such display, according to the below-described update specification, indicates, for example, that due to "manual updating" there is the possibility that the newest value is not displayed. Further, the symbol SG indicates the ability of the user to command updating as desired (command "manual updating"), and in the below-described manner, when this operation is performed for the power consumption amount D3, such element data is acquired from the server 40 and the like, and the power consumption amount D3 is updated to the newest amount (in the case in which newest element data exists). The screen definition data is described below more specifically in reference to FIG. 4.

Figure 4:
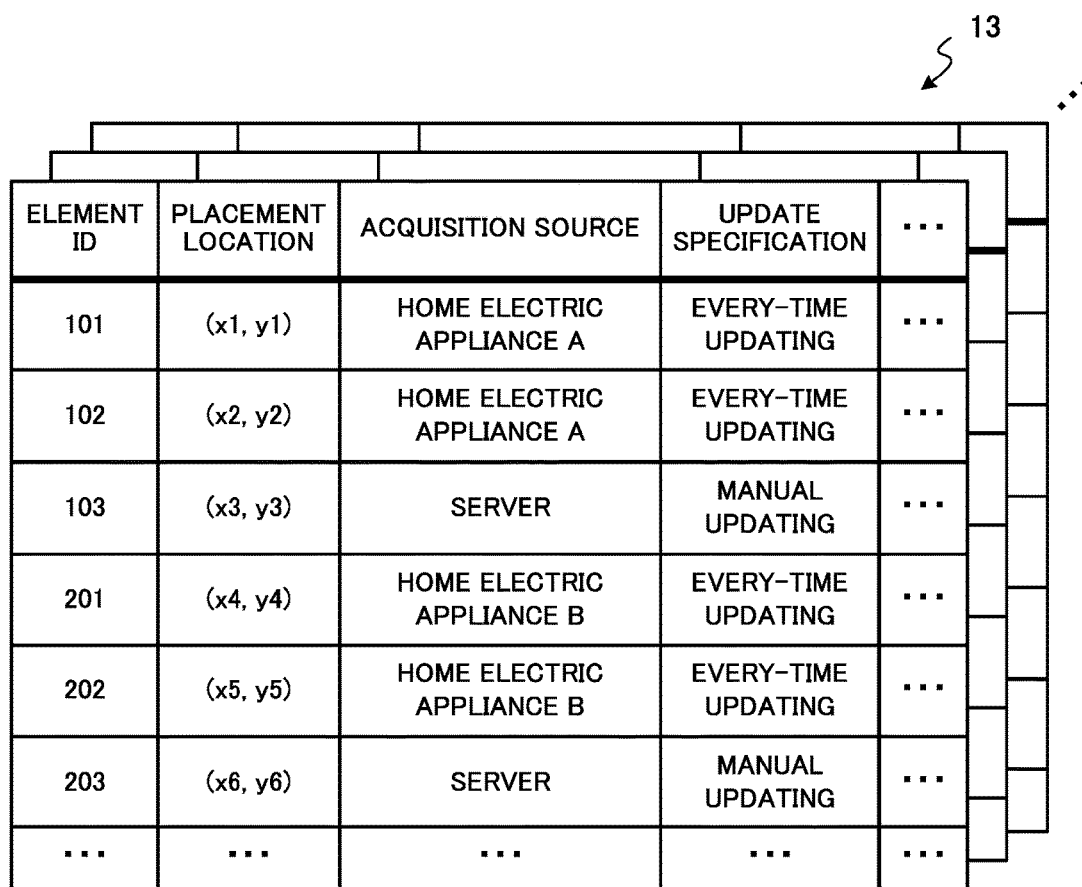
FIG. 4 is a schematic drawing illustrating one example of screen definition data in Embodiment 1.

FIG. 4 is a schematic drawing illustrating one example of screen definition data stored in the screen definition data storage 13. As illustrated in the figure, the screen definition data includes the element ID, the placement location, an acquisition source, and the update specification. Further, although the names of the home electric appliances 20 and the server 40 are indicated as acquisition sources, these names are indicated for ease of description, and the element data would be actually defined by a stored address, file name (data name), and the like. Further, the update specification indicates the update timing, update method, and the like of the element data. For example, when the update specification is "every-time updating", the control device 15 (more specifically, the below-described screen generator 151) attempts acquisition of the newest element data every time that the management screen is generated. Further, if the update specification, for example, is "manual updating", then the control device 15 acquires the element data from the below-described cache data storage 14 (in the case in which the target element data is stored) during generation of the management screen. That is to say, due to prior specification of "every-time updating" in the update specification for element data that is required to be the newest element data, effectiveness (real-timeliness) of such element data is ensured. On the other hand, due to prior specification of "manual updating" in the update specification for element data that is not required to be the newest element data, response performance can be improved due to the acquiring of previously stored element data from the cache data storage 14 and not performing communication. Further, the update specification is not limited to these "every-time updating" and "manual updating" specifications, and other content may be specified. For example, in the case of specification as "time-slot-specific updating", the control device 15, when generation of the management screen occurs at a time period included in a designated time slot, attempts to acquire the newest element data in a similar manner as the aforementioned "every-time updating". On the other hand, when the management screen is generated at a time outside of the designated time slot, the control device 15 acquires the element data from the cache data storage 14 in a similar manner as in the aforementioned "manual updating". The element data for which "time-slot-specific updating" is specified in this manner is the element data that is required, only in this time slot, to be the newest element data. For example, when the user wants to check at noon the newest amount for the power consumption amount D3 in the aforementioned management screen P1 of FIG. 3, the element data may be previously specified as the "time-slot-specific updating" (for example, 12:00 to 13:00). Thus when the control device 15 generates the management screen P1 at noon, which is a time included in the designated time slot, the power consumption amount D3 (power consumption amount of each room) generated in the management screen P1 is not displayed in gray as illustrated in FIG. 3, but rather is displayed normally in the same manner as the temperature D1 and the humidity D2, and the symbol SG is omitted. Further, the screen definition data illustrated in FIG. 4 is one example of such data, and may include other graphics, text, and the like included in the management screen P1.

Again in reference to FIG. 2, the cache data storage 14 includes, for example, non-volatile semiconductor memory, and stores each of the element data acquired from the server 40 and the home electrical devices 20. That is to say, each of the previously-acquired element data is stored as cache data. Each of the element data stored in the cache data storage 14 is substantially the same as the content of the aforementioned screen definition data illustrated in FIG. 4, although stored element data also includes the update date and time of the stored element data. In a below described manner, when the control device 15 attempts to acquire new element data from the server 40, this update date and time is transmitted from the outside-of-house communicator 12 to the server 40, and this update date and time is used by the server 40 to determine whether the server 40 has the newest element data.

The control device 15 includes components such as a central processing unit (CPU), a read only memory (ROM), and a random access memory (RAM) (none of which are illustrated), and performs overall control of the controller 10. The control device 15 includes as functional components a screen generator 151, a cache data updater 152, an operation receiver 153, and a command device 154. These functions can be realized, for example, by the CPU using the RAM as working memory for suitable execution of various types of programs (such as programs for the below-described screen generation processing) stored in ROM.

Generation of the management screen by the screen generator 151 is based on the screen definition data. During such generation, the screen generator 151 acquires, on the basis of each update specification specified in the aforementioned screen definition data of FIG. 4, element data from the cache data storage 14, or from the server 40 and the home electric appliances 20, and then the screen generator 151 generates the management screen.

Specifically, the screen generator 151 generates, on the basis of the screen definition data, the aforementioned management screen P1 as illustrated in FIG. 3. At this time, in the case in which the update specification of the element data is stipulated as "every-time updating", the screen generator 151 attempts to acquire the newest element data. For example, in the case in which the acquisition source is the server 40 (more specifically, is the address and file name of the server 40), the screen generator 151 transmits to the server 40 through the outside-of-house communicator 12 the update date and time of the element data (same address, same file name, and the like) previously stored in the cache data storage 14, and the server 40 determines whether the server 40 has the newest element data. In this case, upon receiving the update date and time, in the below-described manner, the server 40 performs a comparison with the update date and time of locally stored element data (same address, same file name, and the like). If the locally stored element data is determined to store the newest element data, such element data is transmitted to the controller 10. On the other hand, in the case of determination that the newest element data is not stored (there is previous transmission to the controller 10), the server 40, rather than transmitting the element data, transmits to the controller 10 the fact that the cache data is the newest data. In this case, the screen generator 151 acquires the element data (same address, same file name, and the like) stored in the cache data storage 14.

Further, when attempting to transmit the update date and time to the server 40, upon determination that the element data (same address, same file name, and the like) is not stored in the cache data storage 14, the screen generator 151 does not request the comparison and the like, but rather requests and acquires the target element data from the server 40 and the like.

Further, in the case in which the update specification of the element data is stipulated as "manual updating", the screen generator 151 acquires the element data from the cache data storage 14. Further, when the element data (same address, same file name, and the like) is not stored in the cache data storage 14, the screen generator 151 requests and acquires the element data from the server 40 and the home electric appliances 20 that are the acquisition sources. In addition, when the update specification of the element data is stipulated to be the aforementioned "time-slot-specific updating", and further when the management screen is generated at a time included in the designated time slot, the screen generator 151 attempts to acquire the newest element data in the same manner as in the aforementioned "every-time updating". On the other hand, when the management screen is generated at a time outside the designated time slot, the screen generator 151 acquires the element data from the cache data storage 14 in the same manner as the aforementioned "manual updating".

The screen generator 151 uses the element data acquired in this manner to generate the aforementioned management screen P1 as illustrated in FIG. 3. That is to say, a normal display such as the temperature D1 and humidity D2 illustrated in the management screen P1 of FIG. 3 is generated for the element data stipulated as "every-time updating" by the update specification. On the other hand, for element data for which the update specification is stipulated to be "manual updating" and the like, a gray display is generated such as that of the power consumption amount D3, with the symbol SG added thereto, as illustrated in the management screen P1 of FIG. 3. Thereafter, the screen generator 151 transmits the generated screen data of the management screen P1 as illustrated in FIG. 3 through the in-house communicator 11 to the terminal device 30.

When the screen generator 151 generates the management screen, the cache data updater 152 updates the cache data storage 14 by storing therein the element data acquired from the server 40 and the home electric appliances 20. For example, if element data that is the same as that acquired from the server 40 and the home electric appliances 20 is stored in the cache data storage 14, the cache data updater 152 updates by overwriting such element data. On the other hand, if element data that is the same as that acquired from the server 40 and the home electric appliances 20 is not stored in the cache data storage 14, then such element data remains stored as is in the cache data storage 14.

The operation receiver 153 receives an operation of the user with respect to the management screen generated by the screen generator 151. For example, after the screen data of the management screen generated by the screen generator 151 is transmitted to the terminal device 30, then upon sending of valid input detection data (for example, data of detection of input to a selection area within the management screen, and the like) from the terminal device 30, an operation of the user with respect to the management screen is received.

The command device 154 sends, through the in-house communicator 11, an instruction for control to the home electric appliance 20 that is the subject of control. For example, in response to the operation received by the operation receiver 153, the command device 154 sends the instruction for control to the home electric appliance 20 that is the subject of control.

Again in reference to FIG. 1, the home electric appliances 20 are various types of electrical products used in various rooms within the home H, and for example, include appliances such as lighting equipment, air conditioners, televisions, induction-heating type cookers, refrigerators, and the like. Further, the types of the home electric appliances 20 are not limited to these examples, and other appliances may be included such as air purifiers, ventilation fans, floor heaters, and the like. One example of configuration of such a home electric appliance 20 is described below in reference to the block diagram of FIG. 5. As illustrated in the figure, the home electric appliance 20 includes a communicator 21, a data storage 22, a main function device 23, and a control device 24.

The communicator 21 is a communication adapter for connection, for example, to the in-house network 80, and under the control of the control device 24, communicates with the controller 10 through the in-house network 80. Further, the communicator 21 may be configured as a detachably-attached external communication adapter.

The data storage 22, for example, includes non-volatile semiconductor memory and the like, and stores element data (for example, the home electric appliance 20 operation condition, temperature, humidity, and home electric appliance 20 power consumption) managed by the home electric appliance 20. Further, the data storage 22 stores programs executed by the control device 24, and the like.

The main function device 23 is controlled by the control device 24 and is a structure for realization of the intrinsic function of the home electric appliance 20, for example, an air-conditioning function of cooling, heating, dehumidification, and the like if the home electric appliance is an air conditioner, or a refrigerating function of refrigeration, freezing, and the like if the home electric appliance is a refrigerator.

The control device 24 includes components such as a CPU, a RAM, and a ROM (none of which are illustrated), and controls each of the aforementioned components. The control device 24 functionally includes a data processor 241 and a control executer 242. These functions are realized by the CPU using the RAM as working memory to suitably execute various types of programs stored in the ROM or the data storage 22.

The data processor 241 sequentially generates element data on the basis of monitoring results such as measurement values from non-illustrated sensors and the like of the home electric appliance 20, operation state, setting state, and the like; and the data processor 241 stores the generated element data in the data storage 22. Thereafter, the data processor 241, in response to a request from the controller 10, transmits the element data stored in the data storage 22 to the controller 10. A configuration may be used such that, at this time, when the data processor 241, in the manner of the below-described server 40, determines that there is newest element data, the data processor 241 transmits such element data to the controller 10.

The control executer 242 causes the main function device 23 to execute control on the basis of the aforementioned instruction of the command device 154 in the controller 10. That is to say, the control executer 242 causes the main function device 23 to execute processing in response to the instruction, such as a control signal, sent from the controller 10.

Again in reference to FIG. 1, the terminal device 30 is a mobile terminal such as a tablet terminal, smart phone, and the like, and is used by the user. One example of configuration of this terminal device 30 is described below in reference to the block diagram of FIG. 6. As illustrated in the figure, the terminal device 30 includes a communicator 31, a display 32, an inputter 33, a data storage 34, and a control device 35.

The communicator 31 includes, for example, an interface using a wireless LAN connection, and under the control of the control device 35, communicates with the controller 10.

The display 32 includes components such as a liquid crystal panel, and under the control of the control device 35, displays various types of screens and the like. Specifically, the display 32, as one example, displays the aforementioned management screen P1 as illustrated in FIG. 3 on the basis of screen data sent from the controller 10.

The inputter 33 includes a touch panel, a touch pad, and the like, and performs processing to receive the operation input from the user. For example, in the case of use of the touch panel as the inputter 33, a transparent plate-like electrostatic capacitance sensor that detects change of electrostatic capacitance is mounted and stacked on a liquid crystal display. Upon detection of contact (pressing) of the touch surface (for the user, the display screen of the liquid crystal display) by the user's finger, dedicated pen, and the like on the basis of this electrostatic capacitance sensor, information (coordinate data) of the touch position is output to the control device 35.

The data storage 34, for example, includes non-volatile semiconductor memory and the like. The data storage 34 temporarily stores the screen data, such as the aforementioned management screen P1, that is previously generated by the controller 10 and received through the communicator 31. In addition, the data storage 34 stores programs executed by the control device 35, and the like.

The control device 35 includes components such a CPU, a ROM, and a RAM (none of which are illustrated), and controls the entire terminal device 30. The control device 35 functionally includes a screen display processor 351 and an input detector 352. These functions can be realized by the CPU using the RAM as working memory for suitable execution of various types of programs stored in the ROM or data storage 34.

The screen display processor 351 displays on the display 32 the management screen, such as the aforementioned management screen P1, on the basis of the screen data sent from the controller 10 through the communicator 31.

Upon receiving from the inputter 33 the operation of the user with respect to the item (for example, various types of selected areas and the like) of the management screen displayed by the display 32, the input detector 352 generates input detection data and sends the generated input detection data to the controller 10 through the communicator 31.

Again in reference to FIG. 1, from among each type of data of each of the home electric appliances 20, the server 40, on the basis of communication with the controller 10, acquires data that requires accumulation, analysis, and the like. One example of configuration of this server 40 is described below in reference to the block diagram of FIG. 7. As illustrated in the figure, the server 40 includes a communicator 41, a data storage 42, and a control device 43.

The communicator 41, for example, is a communication adaptor for connection to the outside-of-house network 90, and under the control of the control device 43, communicates with the controller 10 through the outside-of-house network 90. For example, the communicator 41 receives data periodically sent from the controller 10 for accumulation, analysis, and the like. Further, the communicator 41 receives the request for element data sent when the controller 10 generates the management screen, the update date and time of the requested element data, and the like.

The data storage 42, for example, includes non-volatile semiconductor memory and the like, and stores the element data (for example, the operation history of each home electronical appliance 20, the temperature history, the humidity history, and the cumulative power consumption amount of each home electric appliance 20) managed by the server 40. Further, the data storage 42 stores programs executed by the control device 43, and the like.

The control device 43 includes components such a CPU, a ROM, and a RAM (none of which are illustrated), and controls each of the aforementioned components. The control device 43 functionally includes a data processor 431. Each of these functions of the control device 43 is realized by the CPU using the RAM as working memory for suitable execution of various types of programs stored in the ROM or the data storage 42.

The data processor 431 performs operations such as accumulating, analyzing, and the like the various types of data sent from the controller 10, generates element data, and causes storage of the element data by the data storage 42. Thereafter, in response to the request from the controller 10, the data processor 431 transmits to the controller 10 the element data stored in the data storage 42. At this time, the data processor 431 determines whether the element data (element data stored in the data storage 42) of the server 40 is newest data, and if the determination is that the element data is newest data, then the data processor 431 sends through the communicator 41 to the controller 10 the element data read from the data storage 42. Specifically, at the update date and time of the element data stored at the controller 10 side, the data processor 431 determines whether the element data of the server 40 side is newer than the element data (cache data) of the controller 10 side, when the update date and time is sent from the controller 10, by comparison with the update date and time of the same element data stored in the data storage 42. Upon determination that the element data of the server 40 is newer, the data processor 431 transmits such element data to the controller 10. On the other hand, upon determination that the element data of the server 40 side is older (or has the same update date and time) than the cache data of the controller 10 side, the data processor 431 transmits to the controller 10 the fact that the cache data is newest.

Figure 8:
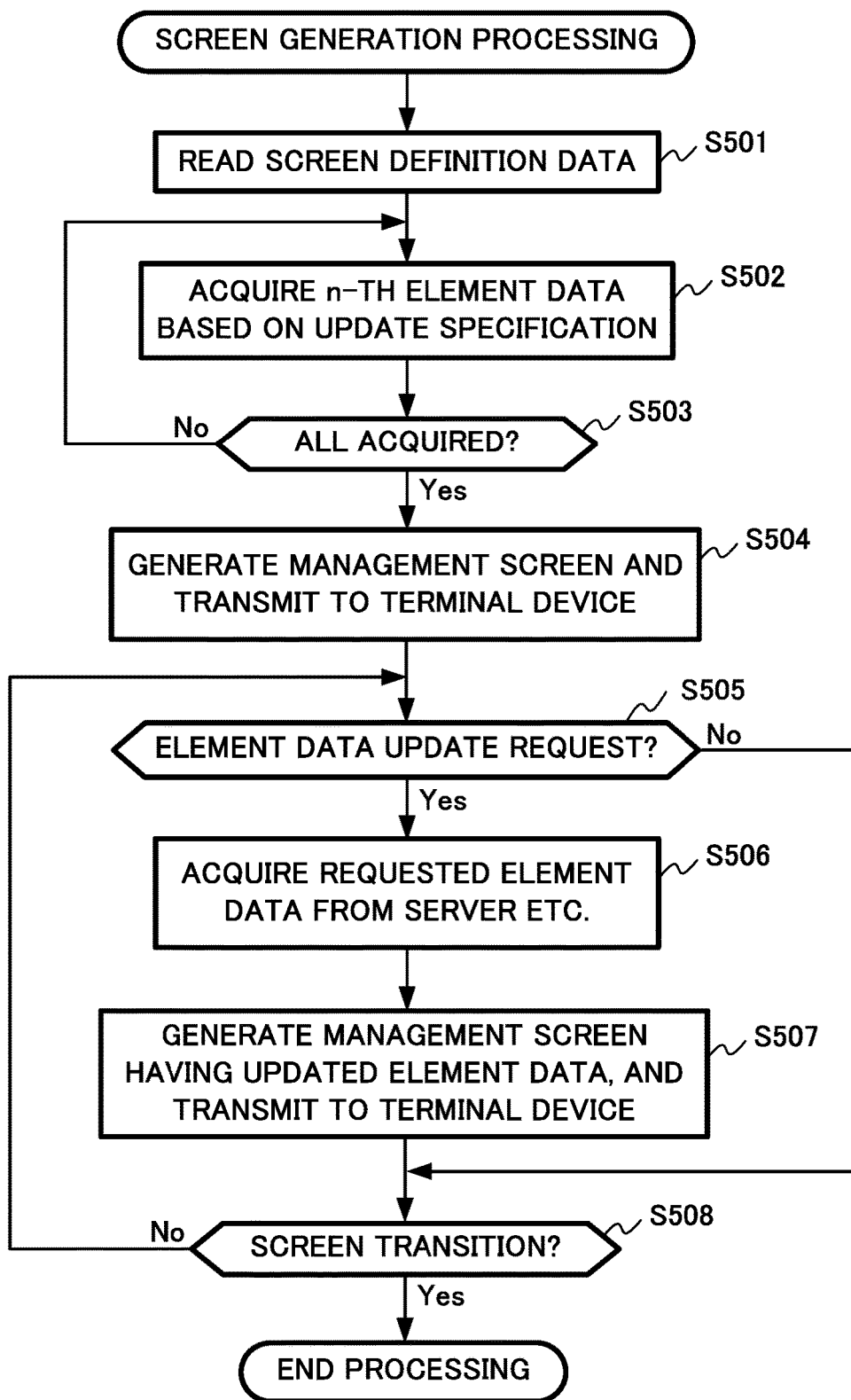
FIG. 8 is a flowchart illustrating one example of screen generation processing in Embodiment 1.

Operation of the controller 10 of Embodiment 1 is described in reference to FIG. 8. FIG. 8 is a flowchart illustrating one example of image generation processing of Embodiment 1 of the present disclosure. This image generation processing is executed when there is a request from the terminal device 30 for generation of a desired management screen.

Firstly, the controller 10 reads the screen definition data that defines the content of the requested management screen (step S501). That is to say, upon a request from the terminal device 30 through the in-house communicator 11 for generation of the management screen, the screen generator 151 reads from the screen definition data storage 13 the screen definition data that defines the content of the management screen.

The controller 10, on the basis of the update specification, acquires the n-th entry of the element data defined by the read screen definition data (step S502). That is to say, in the case in which the update specification for the n-th entry of the element data specifies the aforementioned "every-time updating" as illustrated in FIG. 4, the screen generator 151 attempts to acquire the newest element data. For example, if the acquisition source of the n-th entry of the element data is the server 40 (more specifically, is the address and file name of the server 40), then the screen generator 151 transmits to the server 40 through the outside-of-house communicator 12 the update date and time of the element data (same address, same file name, and the like) stored in the cache data storage 14, and the server 40 is made to determine whether the element data is newest. Thereafter, upon determination by the server 40 side that the server 40 side stores the newest element data, the element data is sent from the server 40 and is acquired (received). On the other hand, upon determination by the server 40 side that the server 40 side does not store the newest element data, the fact that the cache data is newest is sent from the server 40 and is received. In this case, the screen generator 151 acquires the element data (same address, same file name, and the like) stored in the cache data storage 14.

Further, in the case in which the update specification of the element data is stipulated to be the aforementioned "manual updating" as illustrated in FIG. 4, the screen generator 151 acquires the element data from the cache data storage 14. Further, if the element data (same address, same file name, and the like) is not stored in the cache data storage 14, the screen generator 151 requests and acquires the element data from the acquisition-source server 40 and/or the home electric appliances 20.

The controller 10 determines whether all of the element data is already acquired (step S503). That is to say, the image generator 151 determines whether the acquisition of all the element data is completed in accordance with the screen definition data. Upon determination that all of the element data is not yet acquired (NO in step S503), the controller 10 returns processing to the aforementioned processing step S502.

On the other hand, when the determination is that all the element data is already acquired (YES in step S503), the controller 10 generates the management screen and transmits the management screen to the terminal device 30 (step S504). Thereafter, the terminal device 30 displays, for example, the aforementioned management screen P1 illustrated in FIG. 3.

The controller 10 determines whether there is reception of an update request of the update data (step S505). For example, when the selection area of the power consumption amount D3 (with the added symbol SG) is pressed by the user in the aforementioned management screen P1 of FIG. 3, the operation receiver 153 determines that an element data update request is received (request for "manual updating"). Upon determination that an element data update request is not received (NO in step S505), the controller 10 proceeds to the processing of the below-described step S508.

On the other hand, when the determination is that there is prior receiving of the element data update request (YES in step S505), the controller 10 acquires the requested element data from the server 40 and the like (step S506). For example, when the acquisition source of the requested element data is the server 40 (more specifically, is the address and file name of the server 40), the screen generator 151 transmits to the server 40 through the outside-of-house communicator 12 the update date and time of the element data (same address, same file name, and the like) stored in the cache data storage 14, and causes the server 40 to make a determination of whether the newest element data is present. Thereafter, upon determination that the server 40 side stores the newest element data, the element data is sent from the server 40, and the element data is acquired (received).

The controller 10 generates the management screen that includes the updated element data, and transmits the management screen to the terminal device 30 (step S507). Thereafter, the terminal device 30 displays the management screen in which the element data is updated on the basis of a manual updating instruction by the user.

The controller 10 determines whether there is prior occurrence of a screen transition (step S508). That is to say, the operation receiver 153 determines whether there is a request by the user, by an operation of the user, for transition to a different management screen. Upon determination is that there is no occurrence of the screen transition (NO in step S508), the controller 10 returns processing to the aforementioned processing of step S505.

On the other hand, when the determination is that there is occurrence of the screen transition (YES in step S508), the controller 10 ends the screen generation processing. Furthermore, specifically, the screen generation processing for the transition-destination management screen starts from the top (step S501).

Due to such screen generation processing, each of the element data included in the management screen, on the basis of the update specifications of the screen definition data, is acquired from the cache data storage 14, or from the server 40 and the home electric appliances 20, and the management screen is generated. That is to say, the element data stored in the cache data storage 14 is acquired, and communication is not performed, for the element data that is not required to be the newest element data, for example, when the specification in the update specification is set beforehand to "manual updating" and the like. Thus response performance of screen generation can be improved. Further, for the element data that is required to be newest, the element data is acquired (when there is newest element data) from the server 40 and the home electric appliances 20 that are the acquisition source, by specifying beforehand the update specification as "every-time updating" and the like. Thus effectiveness (real-timeliness) of such element data can be ensured. That is to say, due to appropriate specification beforehand of the update specification of each of the element data in accordance with an actual condition (for example, "easy-to-use") of the management screen, the response performance of screen generation can be appropriately improved.

Embodiment 2

Although the aforementioned controller 10 of Embodiment 1 is described above in the case of use of the screen definition data of the aforementioned content illustrated in FIG. 4, the management screen may be generated in a stepwise manner using screen definition data that has different content. The controller 10 and the like of Embodiment 2 of the present disclosure is described below. Further, the configuration of the controller 10 of Embodiment 2 is nearly the same as the aforementioned configuration illustrated in FIG. 2.

Figure 9:
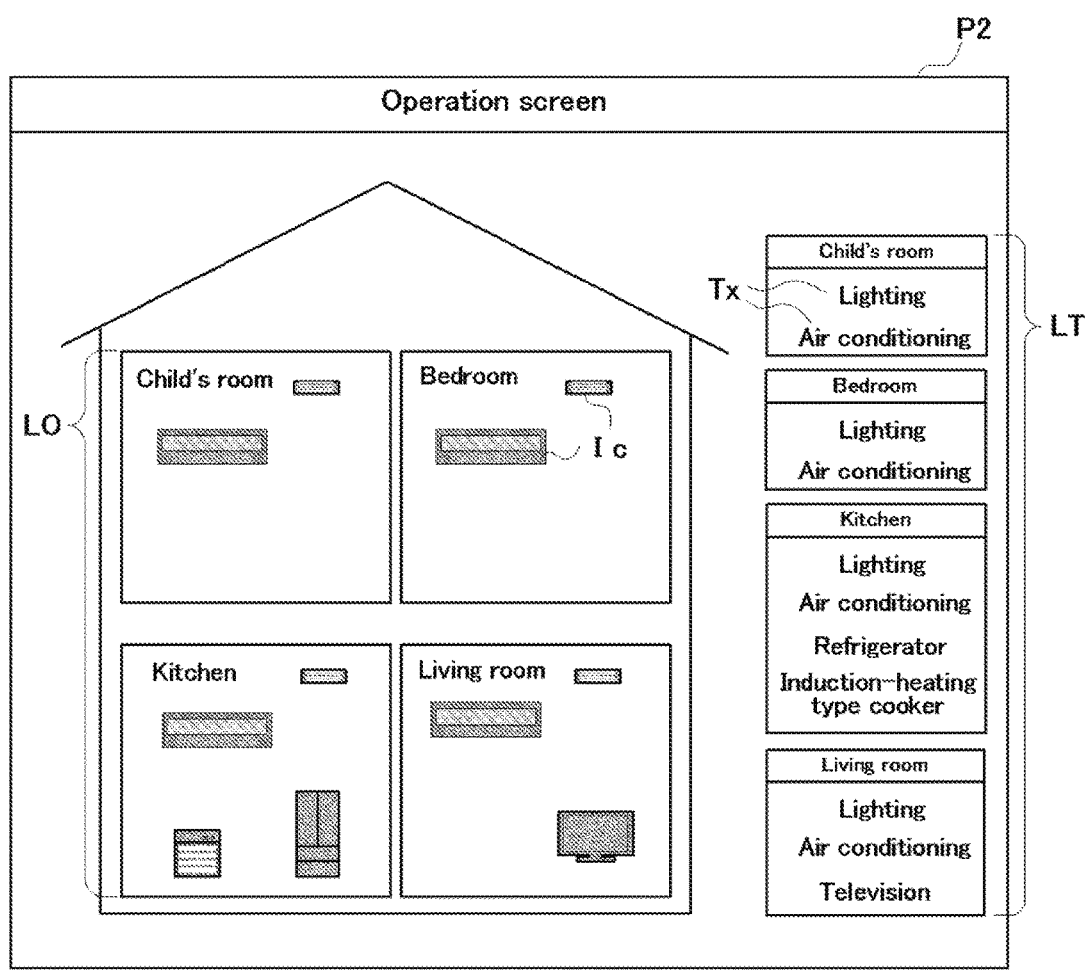
FIG. 9 is a schematic drawing illustrating one example of a management screen (operation screen)

However, the screen definition data stored in the screen definition data storage 13, as described below, differs from the aforementioned content illustrated in FIG. 4. Specifically, the screen definition data storage 13 of Embodiment 2 stores the screen definition data that stipulates each of the element data, placement locations thereof, and the like necessary for generation of a management screen P2 (operation screen) such as that illustrated in FIG. 9. Further, the element data in the management screen P2 are the selection text column Tx in the list region LT, the selection icons Ic in the layout region LO, and the like illustrated in FIG. 9. The screen definition data is described more specifically below in reference to FIG. 10.

Figure 10:
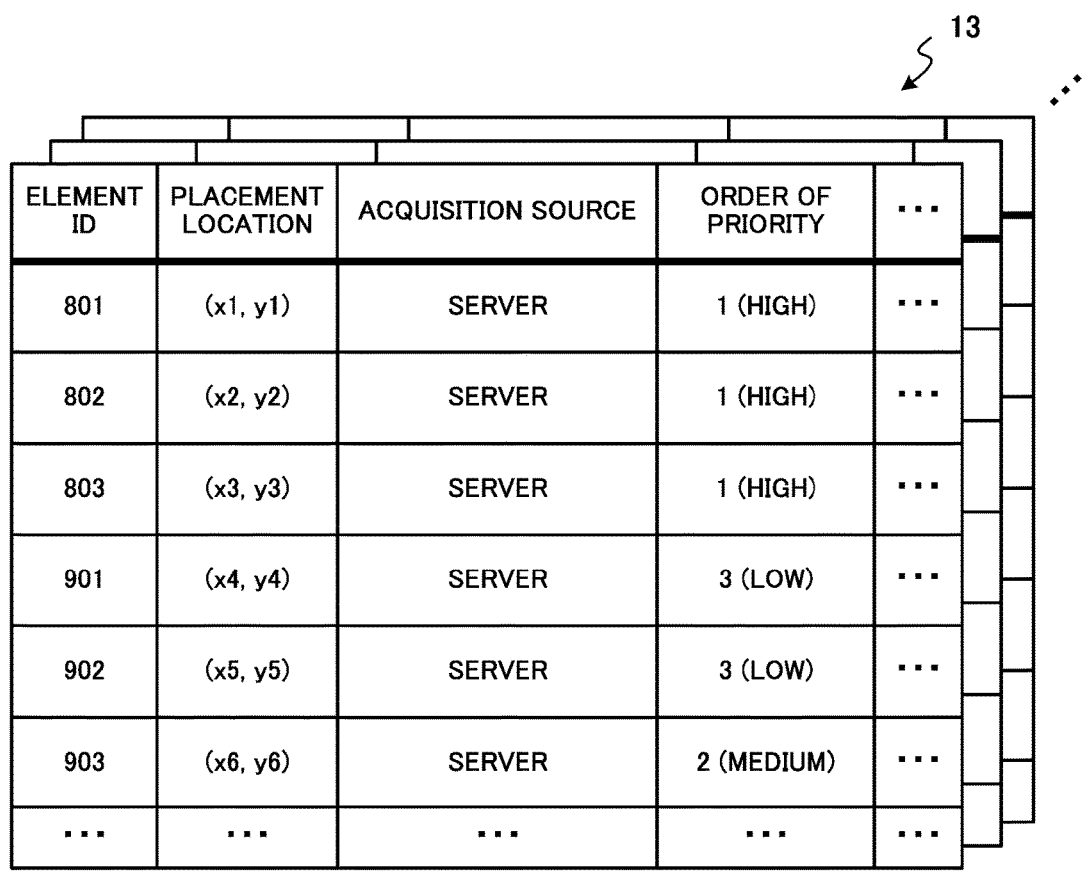
FIG. 10 is a schematic drawing illustrating one example of screen definition data in Embodiment 2.

FIG. 10 is a schematic drawing illustrating one example of the screen definition data stored in the screen definition data storage 13. As illustrated in the figure, the screen definition data includes the element ID, the placement location, the acquisition source, and the order of priority. The order of priority defines the order of acquisition during stepwise generation of the management screen by the image generator 151. For example, firstly the element data that is stipulated to have the order of priority of "1 (high)" is acquired and a first step management screen is generated. Thereafter, the element data that is stipulated to have the order of priority of "2 (medium)" is acquired and a second step management screen is generated. Finally, the element data that is stipulated to have the order of priority of "3 (low)" is acquired and a third step management screen (final management screen) is generated. Although three steps are indicated in this example as the order of priorities "1" to "3", appropriate modification is possible as long as there are at least two or more steps. Further, the update specifications of FIG. 4 may be used to replace those of the example of FIG. 10, and the orders of priorities may be added while leaving the update specifications of FIG. 4 unchanged.

Figure 5:
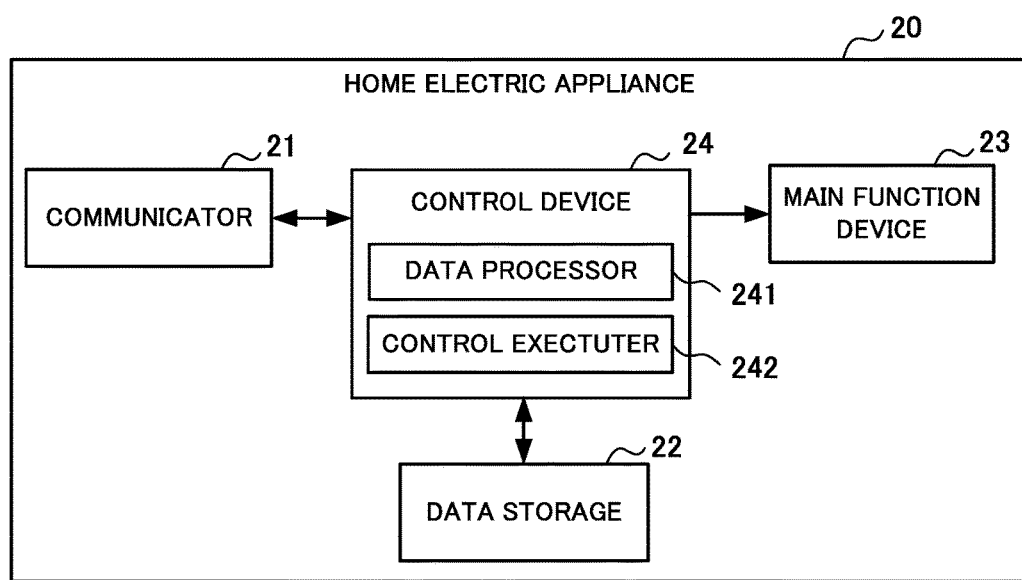
FIG. 5 is a block diagram illustrating one example of configuration of a home electric appliance of Embodiment 1.
Figure 6:
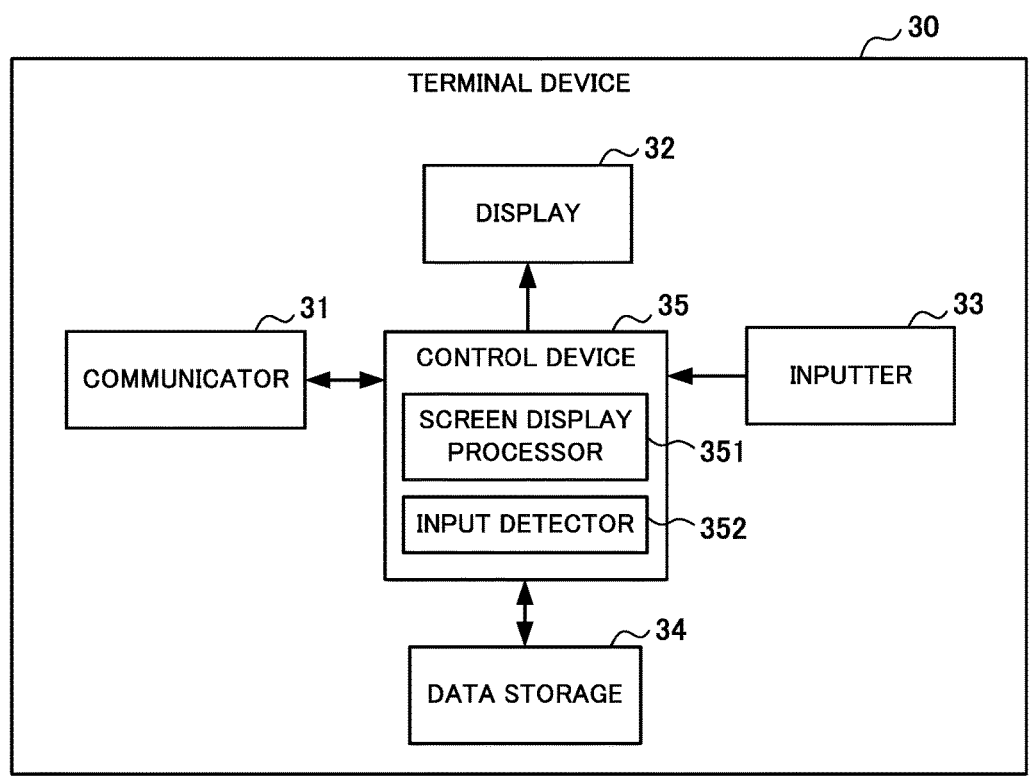
FIG. 6 is a block diagram illustrating one example of configuration of a terminal device of Embodiment 1.
Figure 7:
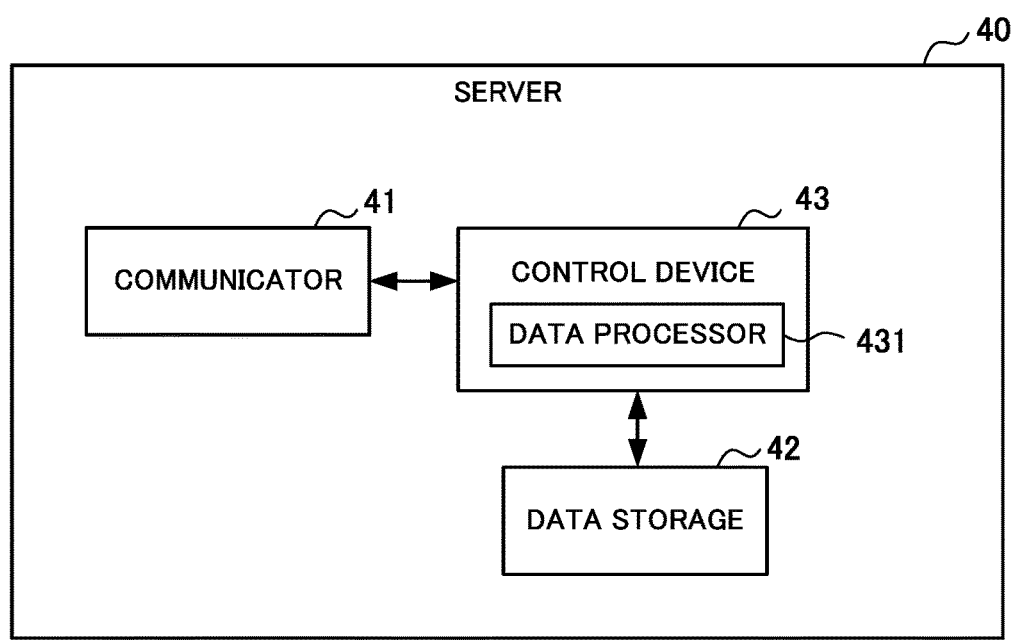
FIG. 7 is a block diagram illustrating one example of configuration of a server of Embodiment 1.

Further, the configurations of each of the home electric appliances 20, the terminal device 30, and the server 40 of Embodiment 2 are similar to those illustrated in the aforementioned FIGS. 5 to 7.

Figure 11B:
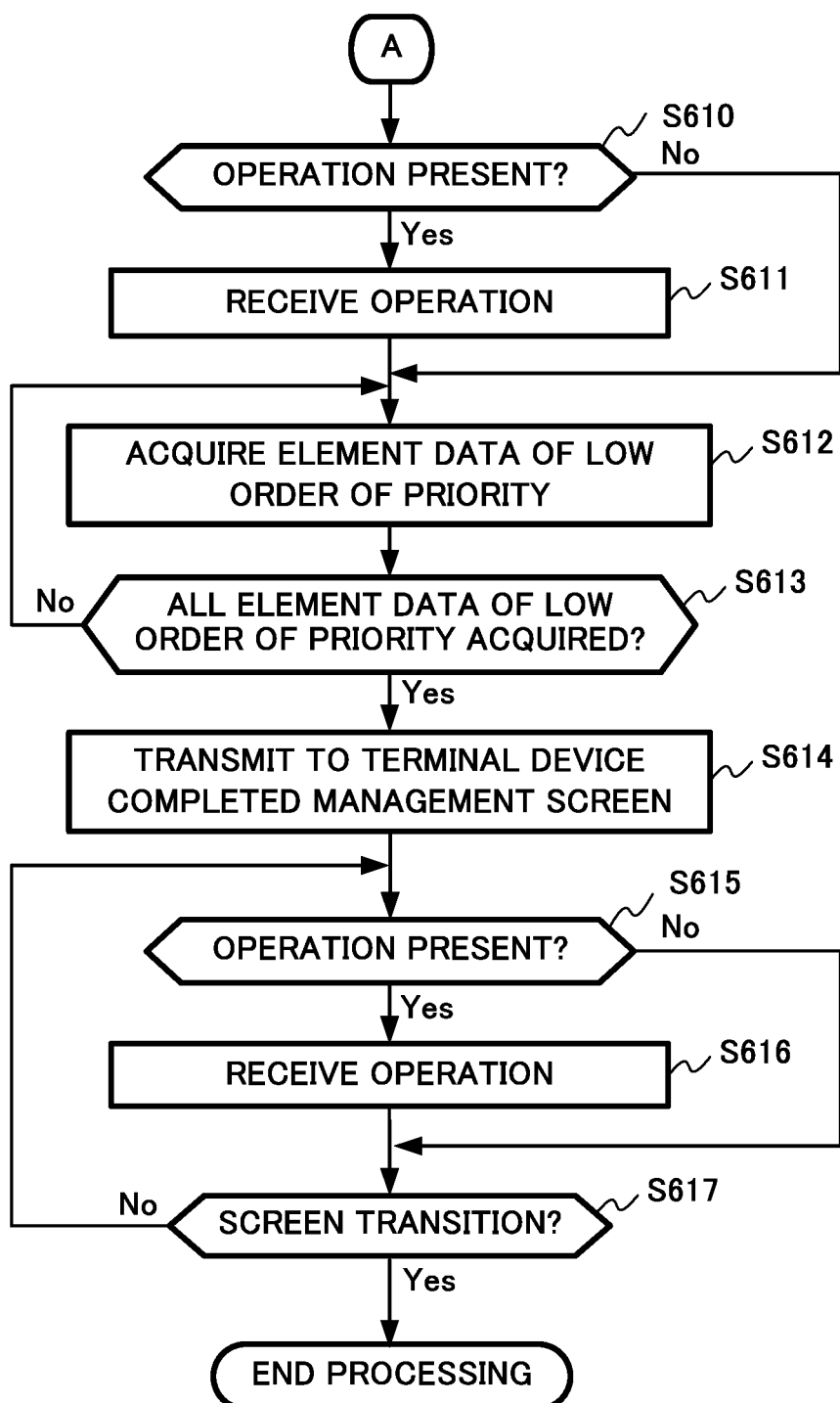

Operation of the controller 10 of Embodiment 2 is described below in reference to FIGS. 11A and 11B. FIGS. 11A and 11B show a continuous flowchart illustrating one example of image generation processing of Embodiment 2 of the present disclosure. This image generation processing is executed in the case in which the generation of a desired management screen is requested from the terminal device 30.

Firstly, the controller 10 reads the screen definition data that defines the contents of the requested management screen (step S601). That is to say, upon request from the terminal device 30 through the in-house communicator 11 for generation of the management screen, the screen generator 151 reads from the screen definition data storage 13 the above described screen definition data, such as that illustrated in FIG. 10, defining the content of the management screen.

The controller 10 acquires the element data of the high priority defined in the read screen definition data (step S602). That is to say, the screen generator 151 acquires the element data that is stipulated to have the order of priority "1 (high)" as illustrated in the aforementioned FIG. 10. At this time, the screen generator 151 transmits to the server 40 through the outside-of-house communicator 12 the update date and time of the element data (same address, same file name, and the like) stored in the cache data storage 14, and causes the server 40 to determine whether the newest element data is present. Thereafter, when the determination is that the server 40 side stores the newest element data, the element data is sent from the server 40 and is acquired (received). On the other hand, when the determination is that the server 40 side does not store the newest element data, the fact that the cache data is newest is sent from the server 40 and is received. In this case, the screen generator 151 acquires the element data (same address, same file name, and the like) stored in the cache data storage 14.

The controller 10 determines whether all of the element data of the high order of priority is acquired (step S603). That is to say, the image generator 151 determines whether the acquisition is completed for all the element data for which the order of priority is stipulated to be "1 (high)" in accordance with the screen definition data. When the determination is that all the high priority element data is not acquired (NO in step S603), the controller 10 returns processing to the aforementioned processing of step S602.

Figure 12A:
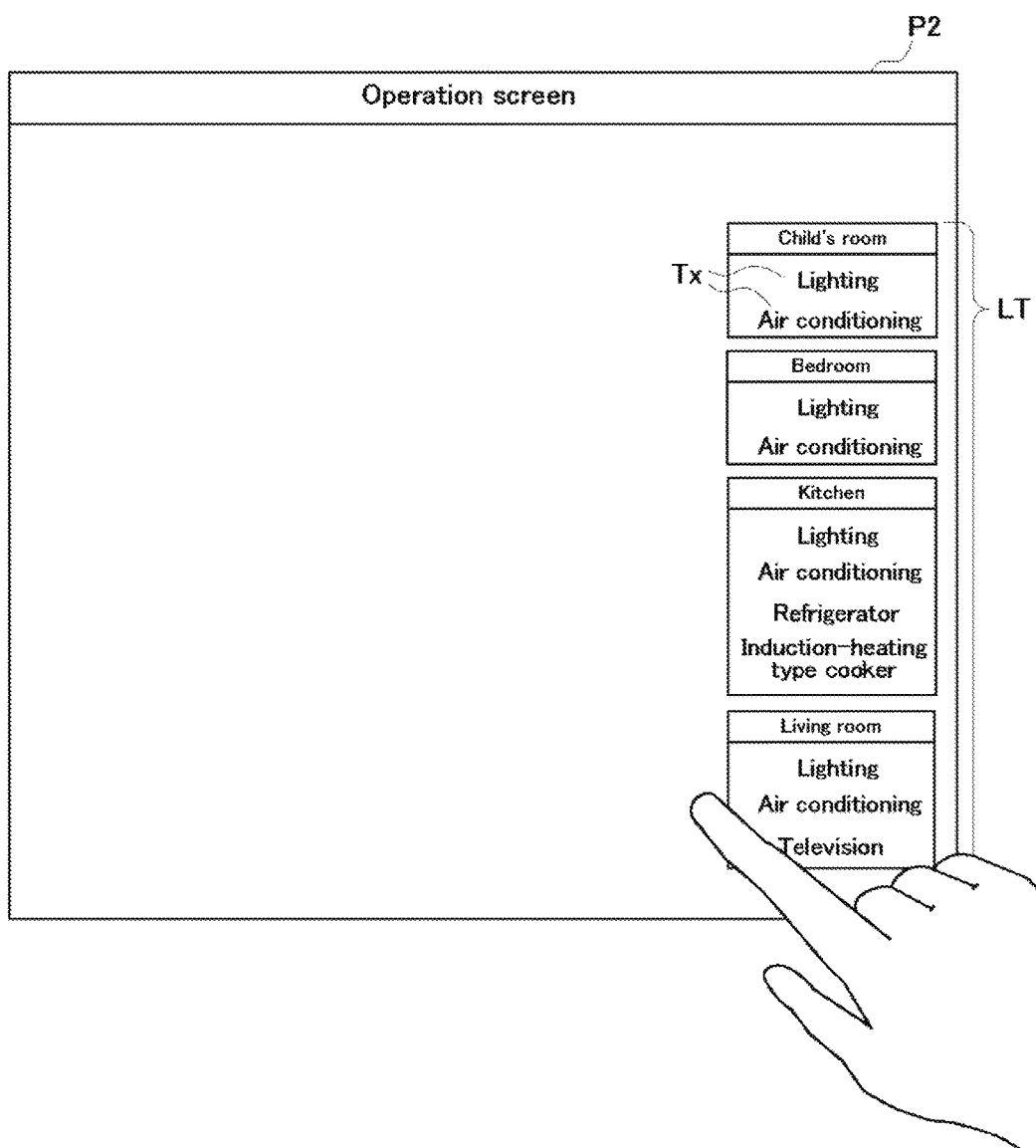
FIG. 12A is a schematic drawing for description of a stepwise generated state of the management screen (operation screen)

On the other hand, when the determination is that all the high priority element data are acquired (YES in step S603), the controller 10 generates the management screen, and transmits the present-step management screen to the terminal device 30 (step S604). The terminal device 30, for example, displays the management screen P2 such as that illustrated in FIG. 12A. The management screen P2 of FIG. 12A is a screen that is generated only from the element data having the high order of priority, and as one example, only the selection text column Tx occurring in the list region LT is displayed.

Again in reference to FIGS. 11A and 11B, the controller 10 determines whether there is a valid operation (step S605). For example, in the case of the user pressing down on any of the selection text columns Tx occurring in the aforementioned list region LT of FIG. 12A, the operation receiver 153 determines that there is a valid operation with respect to the present-step management screen. When the determination is that there is no operation (lack of a valid operation) (NO in step S605), the controller 10 proceeds to the processing of the below-described step S607.

On the other hand, when the determination is that of the presence of the valid operation (YES in step S605), the controller 10 receives the operation from the user (step S606).

The controller 10 acquires the element data for which the order of priority defined by the read screen definition data is medium (step S607). That is to say, the screen generator 151 acquires the element data for which the aforementioned order of priority, as indicated in FIG. 10, is "2 (medium)". Also at this time, the screen generator 151 transmits to the server 40 through the outside-of-house communicator 12 the update date and time of the element data stored in the cache data storage 14, and causes the server 40 to determine whether the newest element data is present. Thereafter, when the determination is that the server 40 side stores the newest element data, the element data is sent from the server 40 and is acquired. On the other hand, when the determination is that the server 40 side does not store the newest element data, the fact that the cache data is newest is sent from the server 40 and is received. In this case, the screen generator 151 acquires the element data stored in the cache data storage 14.

The controller 10 determines whether all of the element data of the medium order of priority is acquired (step S608). That is to say, the image generator 151 determines whether the acquisition is ended for all the element data for which the order of priority is stipulated to be "2 (medium)" in accordance with the screen definition data. When the determination is that all the medium priority element data is not acquired (NO in step S608), the controller 10 returns processing to the aforementioned processing of step S607.

Figure 12B:
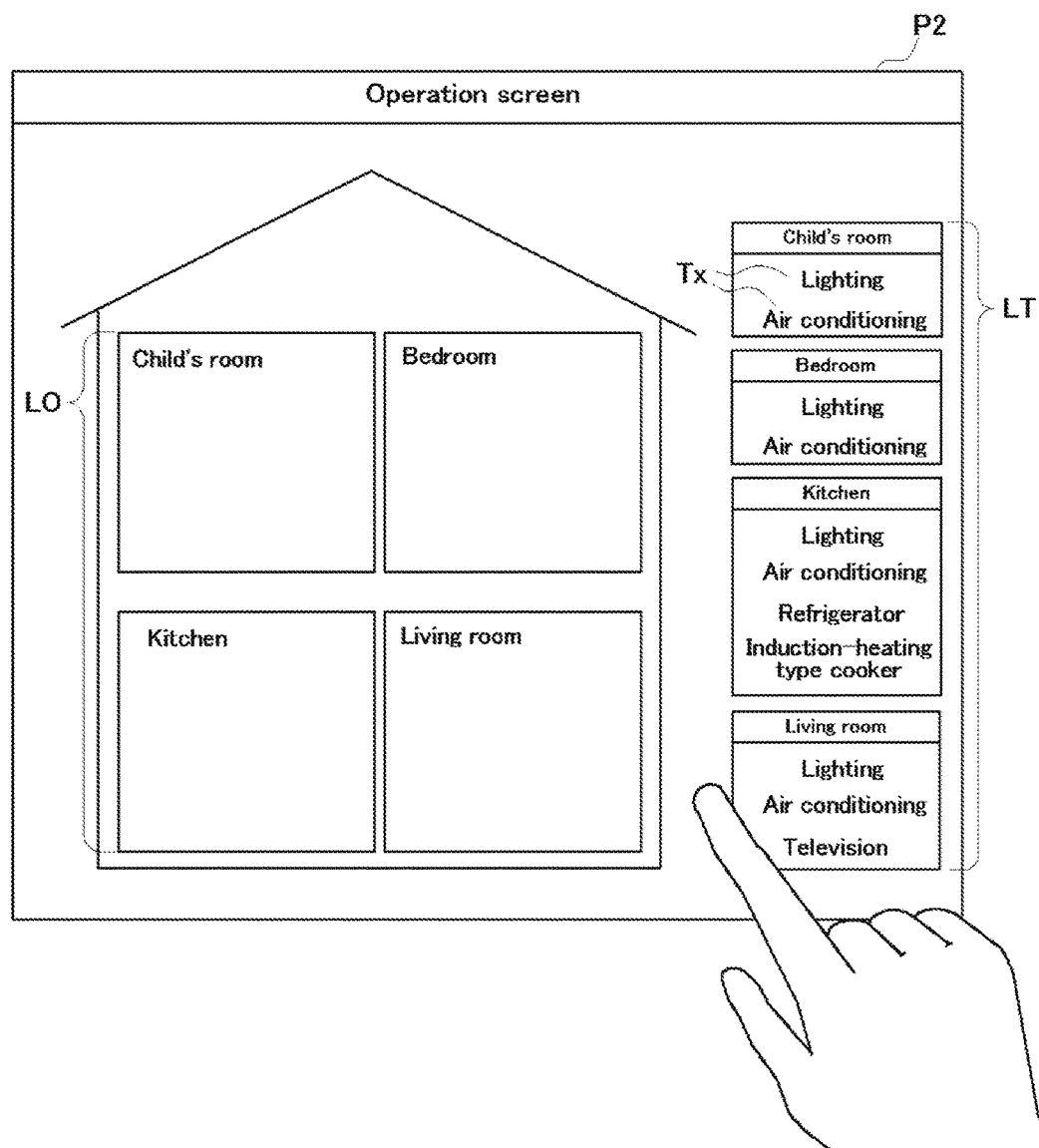
FIG. 12B is a schematic drawing for description of the stepwise generated state of the management screen (operation screen)

On the other hand, when the determination is that all the medium priority element data are acquired (YES in step S608), the controller 10 generates the management screen, and transmits the present-step management screen to the terminal device 30 (step S609). The terminal device 30, for example, displays the management screen P2 such as that illustrated in FIG. 12B. The management screen P2 of FIG. 12B is a screen that is generated only from the element data having the high and medium orders of priority, and as one example, only the selection text column Tx occurring in the list region LT and the layout region LO outline box are displayed. That is to say, although the display of something later in the layout region LO can be anticipated, at the present step, operation is only possible with respect to the selection text column Tx in the list region LT.

Again in reference to FIGS. 11A and 11B, the controller 10 determines whether there is a valid operation (step S610). For example, in the case of the user pressing down on any of the selection text columns Tx occurring in the list region LT of FIG. 12B, the operation receiver 153 determines that there is a valid operation with respect to the present-step management screen. When the determination is that there is no operation (lack of a valid operation) (NO in step S610), the controller 10 proceeds to the processing of the below-described step S612.

On the other hand, when the determination is that of the presence of the valid operation (YES in step S610), the controller 10 receives the operation from the user (step S611).

The controller 10 acquires the element data for which the order of priority defined by the read screen definition data is low (step S612). That is to say, the screen generator 151 acquires the element data for which the order of priority, as indicated in FIG. 10, is "3 (low)". Also at this time, the screen generator 151 transmits to the server 40 through the outside-of-house communicator 12 the update date and time of the element data stored in the cache data storage 14, and causes the server 40 to determine whether the newest element data is present. Thereafter, when the determination is that the server 40 side stores the newest element data, the element data is sent from the server 40 and is acquired. On the other hand, when the determination is that the server 40 side does not store the newest element data, the fact that the cache data is newest is sent from the server 40 and is received. In this case, the screen generator 151 acquires the element data stored in the cache data storage 14.

The controller 10 determines whether all of the element data of the low order of priority is acquired (step S613). That is to say, the image generator 151 determines whether the acquisition is ended for all the element data for which the order of priority is stipulated to be "3 (low)" in accordance with the screen definition data. When the determination is that all the low priority element data is not acquired (NO in step S613), the controller 10 returns processing to the aforementioned processing of step S612.

Figure 12C:
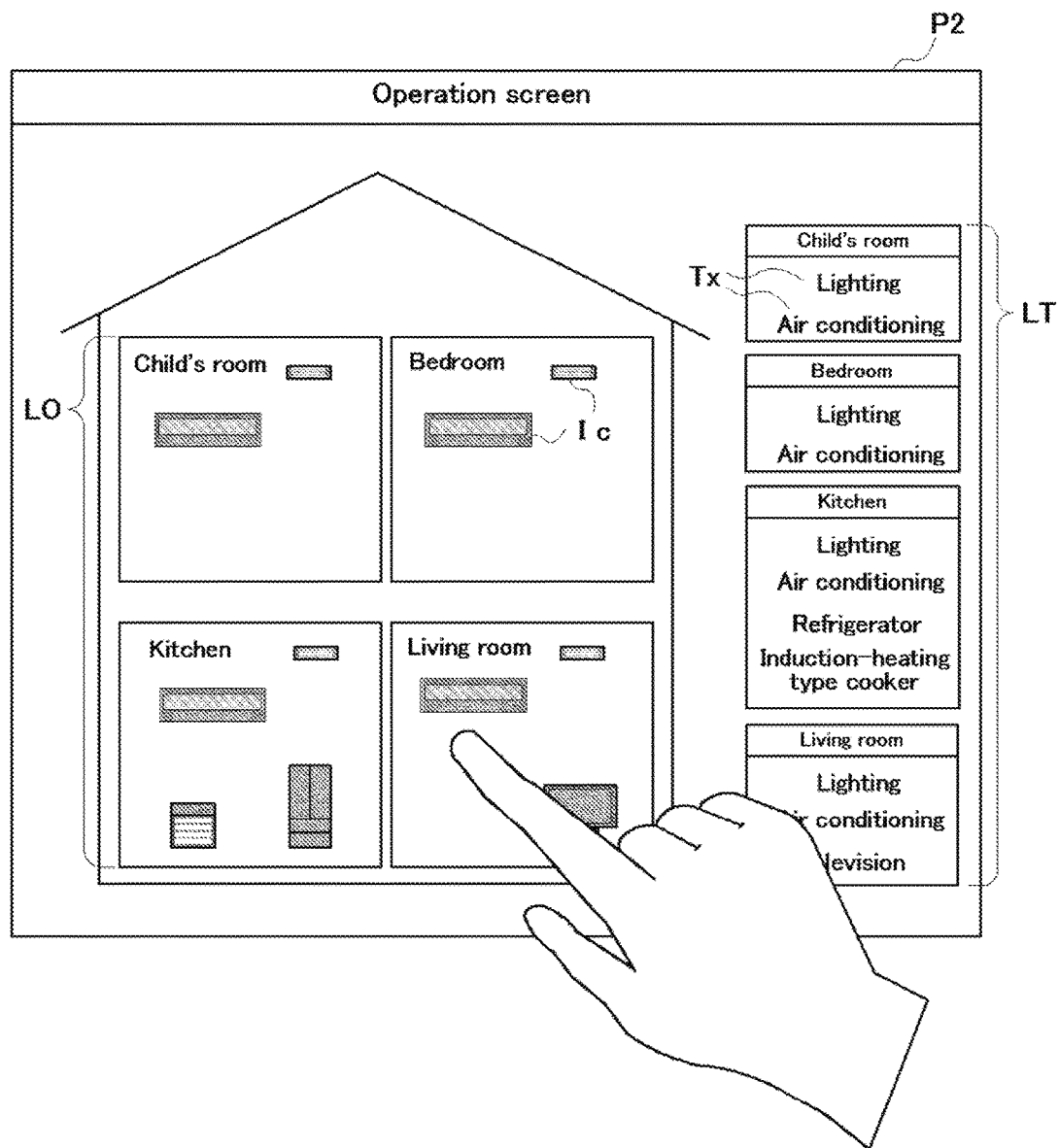
FIG. 12C is a schematic drawing for description of the stepwise generated state of the management screen (operation screen)

On the other hand, when the determination is that all the low priority element data is acquired (YES in step S613), the controller 10 generates the management screen, and transmits the completed management screen to the terminal device 30 (step S614). The terminal device 30, for example, displays the management screen P2 such as that illustrated in FIG. 12C. The management screen P2 of FIG. 12C is a screen that is generated from all the element data, and as one example, the selection text column Tx occurring in the list region LT and the selection icons Ic occurring in the layout region LO are all displayed. That is to say, a state occurs in which operation is newly possible with respect to selection icons Ic occurring in the layout region LO.

Again in reference to FIGS. 11A and 11B, the controller 10 determines whether there is a valid operation (step S615). For example, in the case of the user pressing down not just on the selection text column Tx occurring in the aforementioned list region LT of FIG. 12C but also in the case of pressing down on the layout icon Ic occurring in the layout region LO, the operation receiver 153 determines that there is a valid operation with respect to the management screen. When the determination is that there is no operation (lack of a valid operation) (NO in step S615), the controller 10 proceeds to the processing of the below-described step S617.

On the other hand, when the determination is that of the presence of the valid operation (YES in step S615), the controller 10 receives the operation from the user (step S616).

The controller 10 determines whether there is the occurrence of a screen transition (step S617). That is it say, the operation receiver 153 determines whether there is a request, by an operation of the user, for a transition to another management screen. When the determination is that there is no occurrence of the screen transition (NO in step S617), the controller 10 returns processing to the aforementioned processing of step S615.

On the other hand, when the determination is that of the occurrence of a screen transition (YES in step S617), the controller 10 ends the screen generation processing. Furthermore, specifically, the screen generation processing for the transition-destination management screen starts from the top step (step S601).

Due to such screen generation processing, the management screen is generated in a stepwise manner on the basis of the order of priority stipulated for each of the element data of the screen definition data. Thus, for example, the order of priority can be set high for element data such as a text string that has a low data amount, and conversely, the order of priority can be set beforehand to be low for element data such as graphics that has a high data amount, thereby causing an improvement of response performance of screen generation. Further, the operation of the user can be received even during any of the various steps of the management screen, and thus the response performance of screen operation can also be improved.

Other Embodiments

In the aforementioned Embodiments 1 and 2, cases are described in which the controller 10 reads the screen definition data after the request for generation of the management screen, and acquires each of the element data. However, in the case in which anticipation is possible of another management screen to which transition is possible on the basis of relatedness between screens, a sequence of operations, and the like, a configuration may be used in which the screen definition data of the anticipated transition-destination other management screen is read prior to the transition, and the acquisition of each of the element data begins.

Figure 13A:
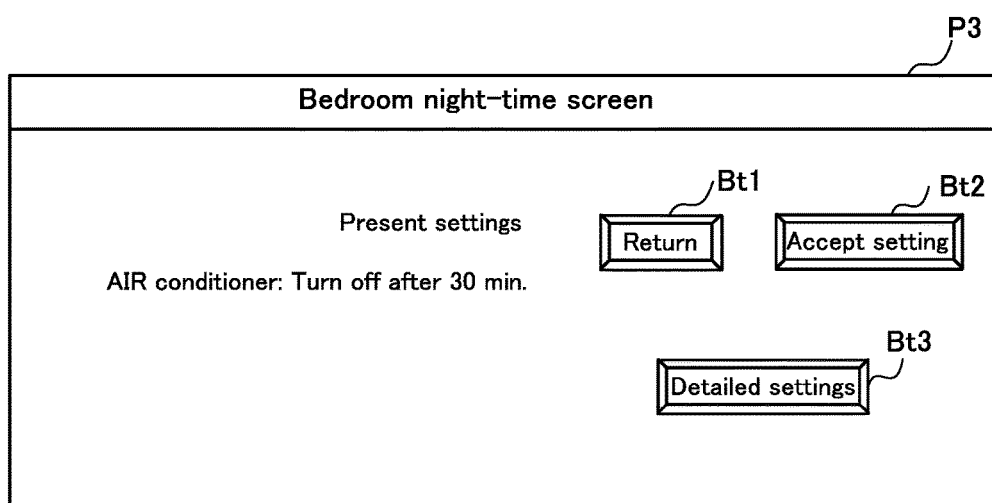
FIG. 13A is a schematic drawing illustrating one example of the management screen (bedroom night-time screen)
Figure 13B:
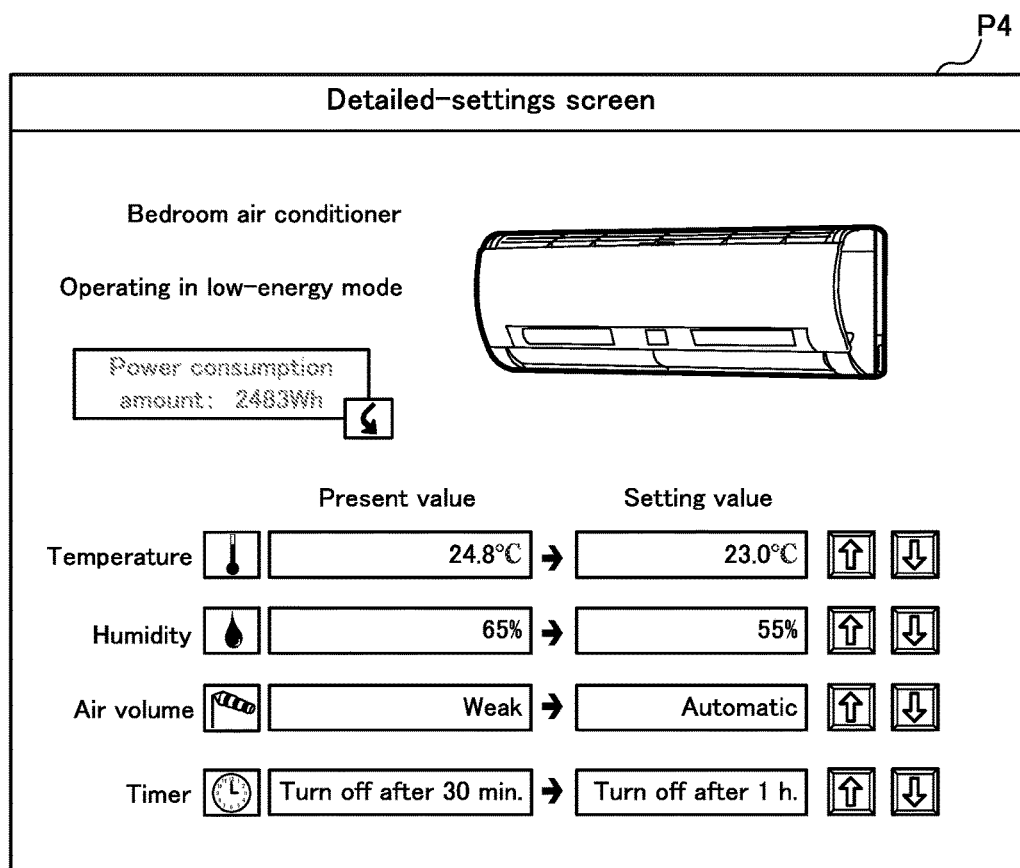
FIG. 13B is a schematic drawing illustrating one example of the management screen (detailed setting screen).

For example, in the case of anticipation of a high probability of transition from a management screen P3 (bedroom night-time screen) such as that illustrated in FIG. 13A to a management screen P4 (detailed-settings screen) such as that illustrated in FIG. 13B, the image generator 151 finishes the generation of the management screen P3, and thereafter in a state in which the transition is not actually occurring, the screen definition data of the management screen P4 is read, and the acquiring of each element data starts. More particularly, a configuration may be used such that the image generator 151 of the controller 10 accumulates the results of transitions between each screen, and can find the probabilities of transitions between each screen. For example, the management screen P3 includes a return button Bt1, an accept-setting button Bt2, and a detailed-settings button Bt3. Further, the transition-destination management screen differs in response to the button Bt1 to Bt3. Further, the transition-destination screen is set to the management screen P4 in the case of pressing down of the detailed-settings button Bt3.

The image generator 151 accumulates results of transitions between screens every time that the user presses down on any of the buttons Bt1 to Bt3 of the management screen P3. Thereafter, when at least a fixed number of results of transitions is accumulated, then upon generation of the management screen P3, the image generator 151 finds, on the basis of the accumulated results of transitions, the respective probabilities of transition to other management screens from the management screen P3. Thereafter, when there exists a transition-destination screen forecast to have a transition probability that is higher than a reference value, the image generator 151 begins prefetch reading for screen generation prior to the screen transition.

For example, in the case in which the transition probability from the management screen P3 to the management screen P4 is higher than the reference value, prior to the pressing down of the button Bt3, the image generator 151 reads the screen definition data of the management screen P4, and starts the acquiring of the element data. At this time, for example, the acquisition of each data element starts on the basis of the update specification as in Embodiment 1. Thereafter, upon completion of the acquisition of all the element data, a state occurs in which the management screen P4 can be generated from just the element data stored in the cache data storage 14. Thus when the detailed-settings button Bt3 of the management screen P3 is actually pressed down, the image generator 151 immediately generates the management screen P4 as illustrated in FIG. 13B. As a result, response performance of screen generation can be appropriately improved.

Although the aforementioned server 40 in the Embodiments 1 and 2 is described above as being installed outside the home H (at a location other than the home), the server 40 may be arranged within the home H (in-house). For example, the server 40 may be a server and the like that includes a gateway function.

Further, in the aforementioned embodiments, cases are described in which, for example, a dedicated controller 10 is used. However, by using, for example, an existing personal computer or information terminal to run an operational program that defines the operations of this controller 10, the personal computer can be made to function as the controller 10 of the present disclosure.

Further, any desired method may be used for distribution of such a program, and for example, the program may be stored and distributed on a computer-readable recording medium such as a compact disk read-only memory (CD-ROM), digital versatile disk (DVD), magneto-optical disk (MO), memory card, and the like, and the program may be distributed through a communication network such as the Internet.

The present disclosure can be embodied in various ways and can undergo various modifications without departing from the broad spirit and scope of the disclosure. Moreover, the embodiment described above is for explaining the present disclosure, and does not limit the scope of the present disclosure. In other words, the scope of the present disclosure is as set forth in the Claims and not the embodiment. Various changes and modifications that are within the scope disclosed in the claims or that are within a scope that is equivalent to the claims of the disclosure are also included within the scope of the present disclosure.

INDUSTRIAL AVAILABILITY

The present disclosure may be used for a controller and a home system, that can cause a suitable improvement in response performance of screen generation.

REFERENCE SIGNS LIST

1 Home system
10 Controller
20 Home electrical appliance
30 Terminal device
40 Server
80 In-house network
90 Outside-of-house network
11 In-house communicator
12 Outside-of-house communicator
13 Screen definition data storage
14 Cache data memory
15, 24, 35, 43 Control device
151 Screen generator
152 Cache data updater
153 Operation receiver
154 Command device
21, 31, 41 Communicator
22, 34, 42 Data storage
23 Main function device
241, 431 Data processor
242 Control executer
32 Display
33 Inputter
351 Screen display processor
352 Input detector

The invention claimed is:

1. A controller configured to connect through a network to a server and a home electric appliance, the server and the home electric appliance suppliably storing element data configured in a management screen for management of the home electric appliance, the controller comprising:
a screen definition data storage configured to store screen definition data defining content of the management screen, the screen definition data including an acquisition source and an update specification, the acquisition source and the update specification defining the element data to be acquired;
a cache data storage configured to store the element data previously acquired from the server and the home electric appliance; and
a screen generator configured to acquire, based on the acquisition source and the update specification included in the screen definition data, the element data from any of the cache data storage, the server, and the home electric appliance, and generate the management screen,
wherein either the home electric appliance or the server is selectably designated as the acquisition source.

2. The controller according to claim 1, wherein the screen generator is further configured to, when attempting to acquire newest element data at least from the server, transmit to the server an update date and time of the element data stored in the cache data storage, and acquire, based on a response from the server, the newest element data from the cache data storage or the server.

3. The controller according to claim 1, further comprising a cache data updater configured to, if same element data exists in the cache data storage when the element data acquired by the screen generator from the server and the home electric appliance is stored in the cache data storage, update the element data by overwriting the existing element data with the acquired element data.

4. The controller according to claim 1, wherein
the screen definition data defines an order of priority for the element data to be acquired; and
the screen generator is further configured to sequentially acquire, based on the order of priority, the element data, and generate stepwise the management screen.

5. The controller according to claim 4, further comprising an operation receiver configured to receive a user operation relative to the management screen generated by the screen generator,
wherein the operation receiver is configured to receive the user operation at any step of the management screen generated stepwise by the screen generator.

6. The controller according to claim 1, wherein
the screen definition data storage is further configured to store a plurality of types of element data corresponding to a plurality of types of management screens; and
the screen generator is further configured to, after generating the management screen, start acquisition of the element data configured in another management screen, the another management screen being transitionable from the generated management screen.

7. A home system comprising:
a server;
a controller; and
a home electric appliance,
the server, the controller, and the home electric appliance being interconnected,
the server and the home electric appliance being configured to suppliably store element data configured in a management screen for management of the home electric appliance,
the controller comprising:
a screen definition data storage configured to store screen definition data defining content of the management screen, the screen definition data including an acquisition source and an update specification, the acquisition source and the update specification defining the element data to be acquired;
a cache data storage configured to store the element data previously acquired from the server and the home electric appliance; and
a screen generator configured to acquire, based on the update specification included in the screen definition data, the element data from any of the cache data storage, the server, and the home electric appliance, and generate the management screen,
wherein either the home electric appliance or the server is selectably designated as the acquisition source.

8. The home system according to claim 7, wherein the screen generator is further configured to, when attempting to acquire newest element data at least from the server, transmit to the server an update date and time of the element data stored in the cache data storage, and acquire, based on a response from the server, the newest element data from the cache data storage or the server.

9. The home system according to claim 7, further comprising a cache data updater configured to, if same element data exists in the cache data storage when the element data acquired by the screen generator from the server and the home electric appliance is stored in the cache data storage, update the element data by overwriting the existing element data with the acquired element data.

10. The home system according to claim 7, wherein
the screen definition data defines an order of priority for the element data to be acquired; and
the screen generator is further configured to sequentially acquire, based on the order of priority, the element data, and generate stepwise the management screen.

11. The home system according to claim 10, further comprising an operation receiver configured to receive a user operation relative to the management screen generated by the screen generator,
wherein the operation receiver is configured to receive the user operation at any step of the management screen generated stepwise by the screen generator.

12. The home system according to claim 7, wherein
the screen definition data storage is further configured to store a plurality of types of element data corresponding to a plurality of types of management screens; and
the screen generator is further configured to, after generating the management screen, start acquisition of the element data configured in another management screen, the another management screen being transitionable from the generated management screen.

13. A screen generation method comprising:
acquiring, by a controller, screen definition data that defines content of a management screen and includes an acquisition source and an update specification defining element data to be acquired, the controller being configured to connect through a network to a server and a home electric appliance, the server and the home electric appliance suppliably storing element data configured in a management screen for management of the home electric appliance;
storing, by the controller, to a cache data storage the element data previously acquired from the server and the home electric appliance; and
acquiring, by the controller, based on the acquisition source and the update specification included in the screen definition data, the element data from any of the cache data storage, the server, and the home electric appliance, to generate the management screen,
wherein either the home electric appliance or the server is selectably designated as the acquisition source.

14. The screen generation method according to claim 13, further comprising, by the controller, when attempting to acquire newest element data at least from the server, transmitting to the server an update date and time of the element data stored in the cache data storage, and acquiring, based on a response from the server, the newest element data from the cache data storage or the server.

15. The screen generation method according to claim 13, further comprising, by the controller, if same element data exists in the cache data storage when the element data is acquired from the server and the home electric appliance is stored in the cache data storage, updating the element data by overwriting the existing element data with the acquired element data.

16. The screen generation method according to claim 13, wherein
the screen definition data defines an order of priority for the element data to be acquired; and
further comprising, by the controller, sequentially acquiring, based on the order of priority, the element data, and generating stepwise the management screen.

17. The screen generation method according to claim 16, further comprising, by the controller, receiving a user operation relative to the management screen which is generated by the controller, wherein the controller is configured to receive the user operation at any step of the management screen generated stepwise by the controller.

18. The screen generation method according to claim 13, further comprising storing, in a screen definition data storage, a plurality of types of element data corresponding to a plurality of types of management screens; and after generating the management screen, starting acquisition of the element data configured in another management screen, the another management screen being transitionable from the generated management screen.

19. A non-transitory computer-readable recording medium having stored thereon a program for causing a computer, connected through a network to a server and a home electric appliance that suppliably store element data configured in a management screen for management of the home electric appliance, to execute:

acquiring screen definition data that defines content of the management screen and includes an acquisition source and an update specification defining element data to be acquired;

storing to a cache data storage the element data previously acquired from the server and the home electric appliance; and acquiring, based on the acquisition source and the update specification included in the screen definition data, the element data from any of the cache data storage, the server, and the home electric appliance, to generate the management screen, wherein either the home electric appliance or the server is selectably designated as the acquisition source.

* * * * *